Figure 1:
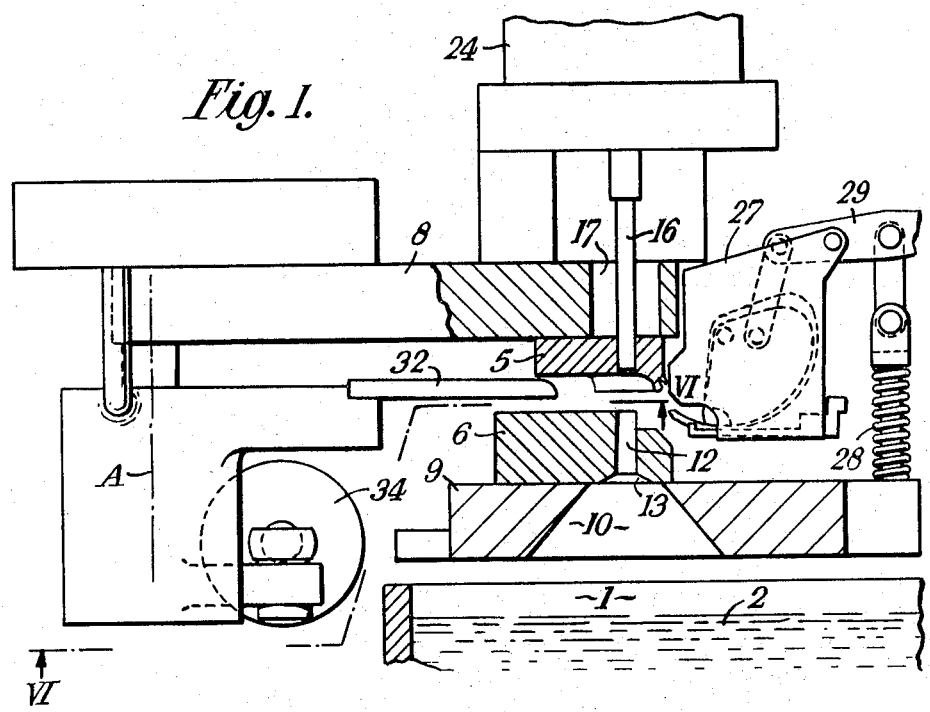
Figure 2:
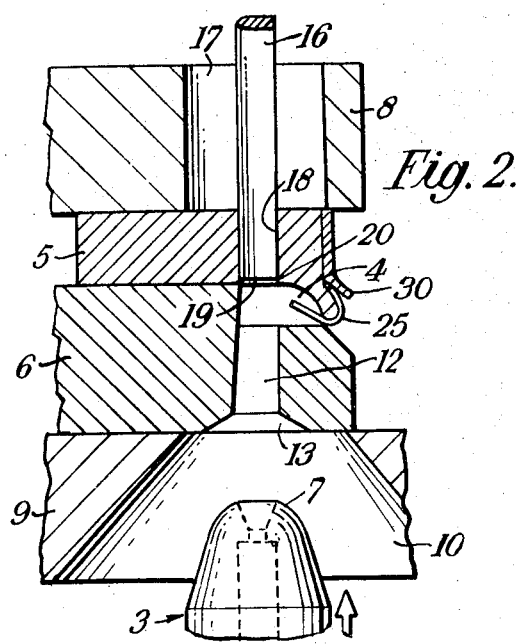

United States Patent
Scott et al.

[11] 3,844,335
[45] Oct. 29, 1974

[54] MOULDING OF METALLIC ARTICLES
[75] Inventors: Walter Roy Scott; David Richard Howard Scott, both of Poole; Nigil Phillip Scott, Wimborne, all of England
[73] Assignee: Airvert Limited, Haddenham, Buckinghamshire, England
[22] Filed: Mar. 14, 1972
[21] Appl. No.: 234,563

[30] Foreign Application Priority Data
Mar. 15, 1971   Great Britain...................... 6850/71

[52] U.S. Cl.................. 164/265, 164/269, 164/131, 164/344, 164/70
[51] Int. Cl............................................ B22c 31/00
[58] Field of Search....... 164/70, 69, 265, 262, 347, 164/269, 401, 404, 131, 344

[56] References Cited
UNITED STATES PATENTS

| | | | |
|---|---|---|---|
| 936,378 | 10/1909 | Soss et al........................ | 164/265 X |
| 1,514,909 | 11/1924 | Kadow............................ | 164/265 X |
| 1,570,669 | 1/1926 | Heinzelman..................... | 164/262 |
| 2,302,367 | 11/1942 | Ericson........................... | 164/265 |
| 3,137,045 | 6/1964 | Sunday............................ | 164/70 |
| 3,191,246 | 6/1965 | Pouell............................. | 164/269 |
| 3,228,073 | 1/1966 | Harrison et al.................. | 164/70 |
| 3,256,572 | 6/1966 | Fisher............................. | 164/265 |

FOREIGN PATENTS OR APPLICATIONS
288,038   10/1915   Germany ........................... 164/265

Primary Examiner—J. Spencer Overholser
Assistant Examiner—V. K. Rising
Attorney, Agent, or Firm—Watson, Cole, Grindle & Watson

[57]  ABSTRACT

A moulding machine for producing moulded lead alloy vehicle wheel balance weights comprises upper and lower moulds movable together during a moulding operation, a lead alloy delivery nozzle movable upwardly to inject molten lead alloy into a passage in the lower mould and thence into the cavity between the moulds, and a punch reciprocable within a passage in the upper mould and operative to push out a sprue or runner, which is formed by the solidified excess lead alloy, through the passage in the lower mould.

12 Claims, 7 Drawing Figures

PATENTED OCT 29 1974 3,844,335

SHEET 2 OF 3

MOULDING OF METALLIC ARTICLES

This invention relates to the moulding of metallic articles and in particular to a moulding machine for producing metallic articles, a method of moulding metallic articles, a pair of moulds and to metallic articles moulded thereby. The term metallic is used herein in a broad sense to include all metals and their alloys.

The process of making moulded articles by injecting moulding material, in a liquid or plastic condition, into a mould cavity produces on each article a sprue or runner formed from the solidified excess material which is always required to ensure that the mould cavity is entirely filled. An object of the present invention is to separate the sprue or runner from the moulded article in a particularly advantageous manner which enables the moulded article to be produced at a high speed with the minimum of wastage of moulding material and thermal energy.

According to one aspect of the invention a moulding machine for producing moulded metallic articles comprises two mould supporting members relatively movable during a moulding operation to bring two moulds together, a material delivery member movable to an aperture in one mould supporting member so that it can inject moulding material, in a fluid or plastic condition, into a passage in one of the moulds and thence into the cavity between the moulds, and a punch movable with respect to the other mould supporting member so that the punch can move within a passage in the other mould and push out the sprue or runner, which is formed by the solidified excess moulding material, through the passage in said one mould. Said one mould is preferably the lower mould, in which case the punch is situated above the operative dispensing end of the delivery member. The machine preferably incorporates a bath for holding moulding material in a molten state, the bath being disposed underneath the lower mould supporting member so that each runner or sprue detached by the punch falls directly into the bath to be remelted therein. Thus, not only is each sprue or runner detached from the corresponding moulded article before the latter is taken out of the mould, but the sprue or runner is allowed to fall directly back into the bath of molten material so that it is cooled by a minimum amount, thereby preventing an unnecessary waste of thermal energy which would be involved if the sprue or runner was first cooled to room temperature and then remelted.

According to another aspect of the invention, a method of making a moulded metallic article by means of two moulds defining a mould cavity therebetween comprises feeding moulding material, in a liquid or plastic condition, through a first passage in one of the moulds and thence into the mould cavity, moving a punch within a second passage in the other mould so as to dislodge a sprue or runner formed by solidified moulding material, the disloded sprue or runner being ejected through the first passage to leave a cleanly moulded article. As before, the detached runner preferably falls into a bath of molten moulding material disposed underneath the two moulds.

The invention also includes within its scope a pair of moulds formed with passages for a punch which dislodges the sprue or runner from each moulded article. Hence, according to a yet further aspect of the invention, there is provided a pair of moulds defining a mould cavity therebetween, one of the moulds having an externally accessible passage for the insertion of metallic moulding material into the cavity and the other mould having a passage, communicating with the passage in said one mould, for the movement of a punch to remove a sprue or runner formed by solidified excess moulding material.

The invention is of especial application to the moulding of vehicle wheel balance weights and according to a further aspect of the invention a wheel balance weight is of arcuate shape having a concave smaller radius edge and a convex larger radius edge, the smaller radius edge having, mid-way along its arcuate edge, an area of visiby different surface characteristics formed by the removal of a sprue or runner by means of a punch.

Figure 7:
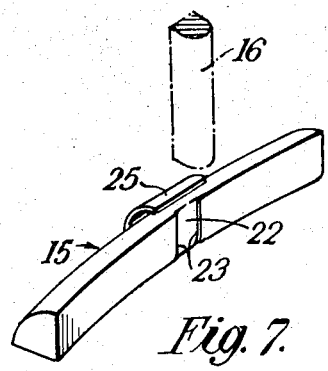
Figure 6:
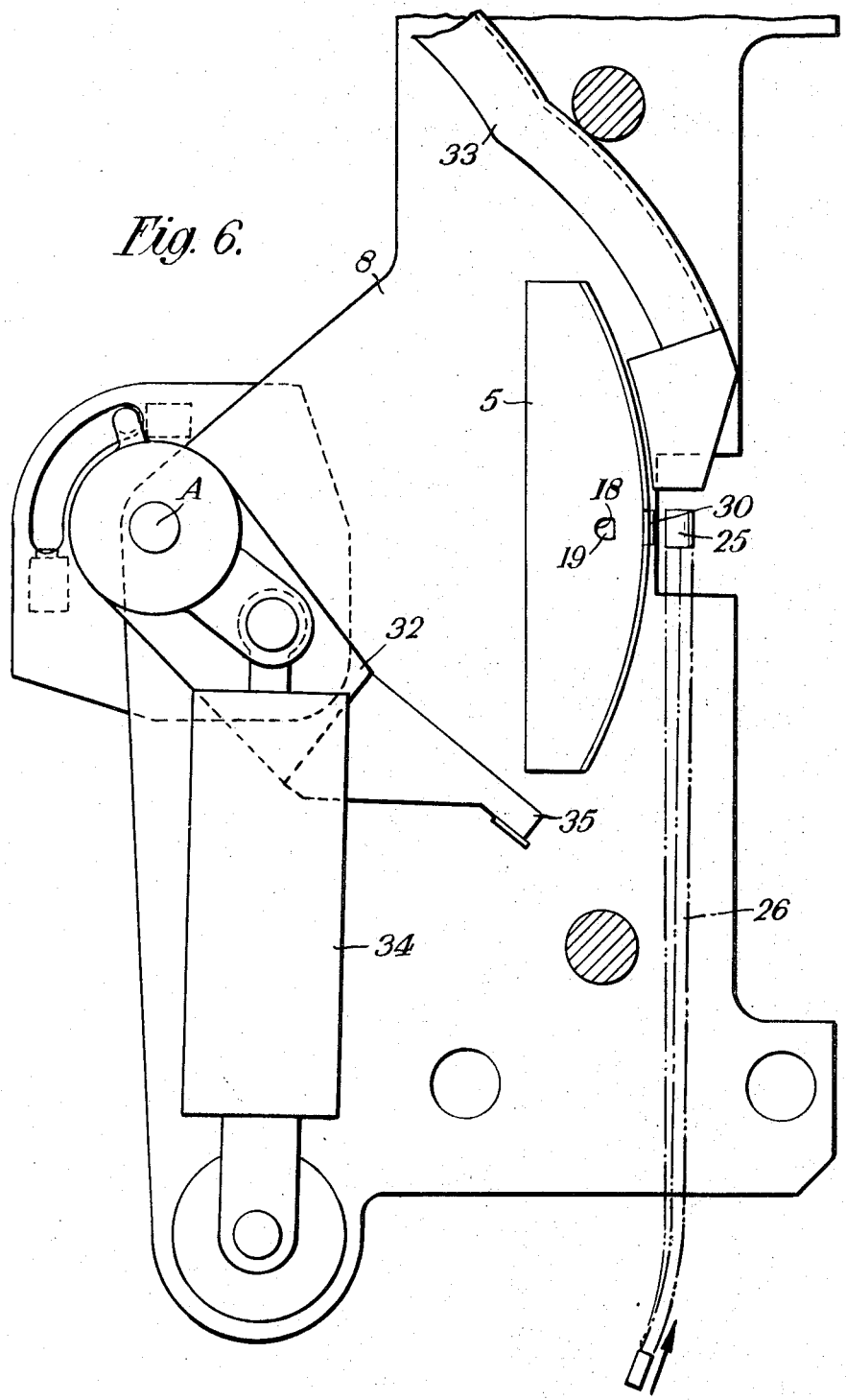

A preferred embodiment of the invention in the form of a moulding machine for producing balance weights for the wheels of motor road vehicles will now be described, by way of example, with reference to the accompanying drawings, in which:

FIG. 1 is a diagrammatic side view, partly in section, showing the moulding machine at the start of an operative cycle, FIGS. 2 to 5 are fragmentary views, to an enlarged scale, respectively showing a portion of the machine at three intermedaite stages in the operative cycle, FIG. 6 is an underside view of a top platen and associated structure of the machine taken on the line VI—VI of FIG. 1, and FIG. 7 is a perspective view of a balance weight made by the machine of FIGS. 1 to 6.

The machine has a base supporting a hollow elongated bath the open top of which is shown at 1 in FIG. 1. The bath contains molten lead alloy moulding material the level of which is shown at 2. The lead alloy is maintained at the desired temperature by a gas-fired heater and a bimetallic strip thermostat (not shown). The machine also includes a material delivery member 3 (FIGS. 2 to 5) which acts to deliver the molten lead alloy into the cavity 4 (FIG. 2) between upper and lower mould 5 and 6. The delivery member 3, which has a nozzle 7 at its upper end, is submerged within the bath of lead alloy at the start of an operative cycle of the machine but rises from the surface of the molten lead alloy to inject the latter into the mould cavity (as in FIGS. 2 and 3) before dropping back and re-entering the bath prior to the next moulding cycle.

Figure 3:
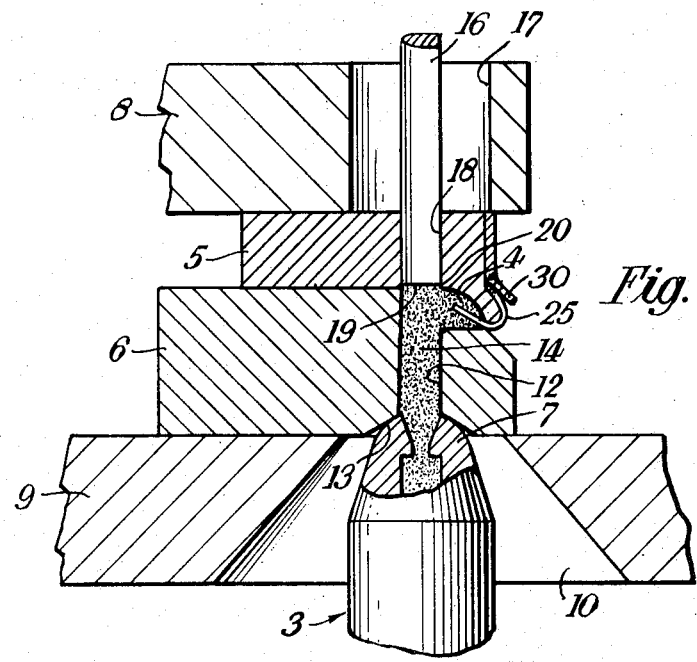

Disposed generally above the nozzle 7 of the delivery member, the machine has a fixed upper mould supporting plate in the form of an upper platen 8 and a movable mould supporting plate in the form of a lower platen 9. These two platens 8 and 9 respectively support the upper and lower moulds 5 and 6 which come together to define the mould cavity 4 upon upward movement of the lower platen 9 towards the upper platen 8. The lower plate 9 has an upwardly tapering aperture 10 through which the nozzle 7 of the delivery member 3 passes on its upward movement from the bath of lead alloy (see FIGS. 2 and 3), and this aperture 10 communicates with and is in alignment with an upwardly converging frusto-conical passage 12 formed in the lower mould 6. The wider and lower end of the passage 12 opens out into a frusto-conical countersunk formation 13 against which the smoothly bulbous upper end of the nozzle 7 seats at the limit of upward movement of the delivery member 3, as seen in FIG. 3. The passage 12 in the lower mould 6 leads into the mould cavity 4 which is of arc-like shape, being defined by the arcs of two circles of differing radii to provide the weight 15 with the crescent-like appearance illustrated in FIG. 7.

By synchronising the movement of the lower platen 9 with the movement of the delivery member 3, molten lead alloy is ejected from the nozzle 7 (by a piston and cylinder arrangement, not shown), passes upwardly through the passage 12 in the lower mould 6 and then fills the mould cavity 4, the excess material 14 (FIG. 3) remaining in the passage 12 in the lower mould 6 and solidifying after a few seconds with the assistance of cooling water which is passed through internal passages in each mould 5 or 6.

Figure 4:
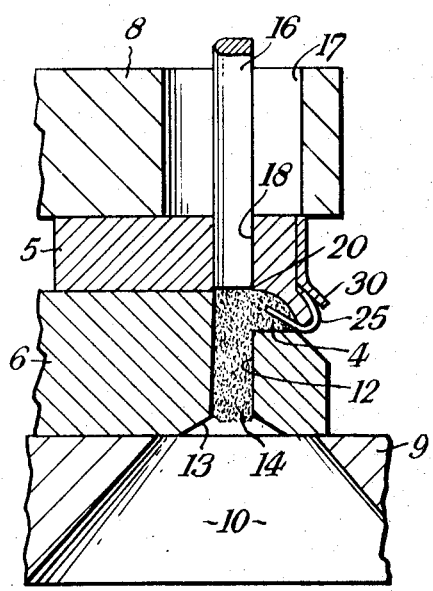
Figure 5:
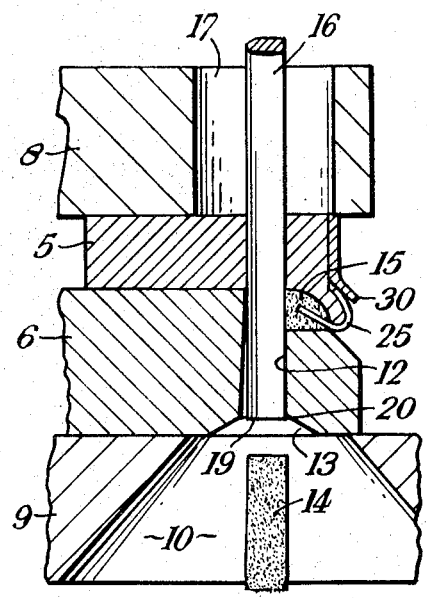

After ejection of a quantity of the molten lead alloy into the cavity 4 between the moulds 5 and 6, the delivery member 3 moves downwardly so that the nozzle 7 is again submerged below the level 2 of the molten lead alloy in the bath, so as to leave the aperture 10 unobstructed (FIG. 4). The sprue or runner formed by the excess solidified lead alloy 14 is removed from the balance weight 15 by means of a punch 16 which extends vertically with all-round clearance through a circular aperture 17 in the upper platen 8 and through an aligned passage 18 in the upper mould 5, the passage 18 being generally D-shaped in cross-section as shown in FIG. 6. The punch 16 moves downwardly from its normal rest position (FIGS. 2, 3 and 4) in such manner that the lower end 19 of the punch 16 enters the passage 12 in the lower mould 6 so as to detach the sprue or runner 14 which falls through the aperture 10 in the lower platen 9 (FIG. 5) and thence into the bath of molten lead alloy where it is remelted.

The punch 16 is D-shaped in cross-section so as to be complementary to the passage 18, and the planar edge 20 of the punch 16 moves vertically in a plane tangential to the smaller radius of the two radii defining the weight 15, as illustrated by the diagrammatic representation of the punch 16 in broken lines in FIG. 7. The sprue or runner 14 is thus separated cleanly from the moulded balance weight 15 at the mid-point of the arcuate length of the weight 15. This separation of the sprue or runner 14 leaves the balance weight 15 with a characteristic surface marking 22, shown in FIG. 7. The marking 22 has parallel side edges 23 spaced by a distance corresponding to the width of the planar edge 20 of the punch 16, the marking 22 typically extending over the major part of the depth of the inner radius of the balance weight 15 and having a smooth rubbed appearance. The punch 16 undergoes two reciprocatory strokes in rapid succession for each balance weight 15 produced, to minimise the chance of a detached sprue or runner 14 adhering to the lower end surface 19 of the punch 16. The punch 16 also acts to close the upper end of the passage 18 in the upper mould 5 when molten lead alloy is injected from the nozzle 7, as shown in FIG. 3.

Movement of the punch 16 and the lower platen 9 is effected by a dual piston and cylinder arrangement 24 (FIG. 1). The two cylinders of the arrangement 24 are fed with hydraulic fluid under pressure, the complete operation of the machine being of an electropneumatic nature controlled by cams and switches so that the required functions are carried out in the appropriate sequence.

Each moulded balance weight 15 includes a clip 25 moulded in situ for attaching the balance weight 15 to the rim of a motor vehicle wheel. The clips 25 are gravity fed to the moulding region along a clip feed rail 26 (FIG. 6), the lower end of which has a detachable clip shovel 27 (FIG. 1) which dispenses indivdual clips 25 into the moulds in synchronism with movement of the platen 9 and the remaining operatively movable parts of the machine. The shovel 27 is caused to dispense clips 25 as a result of a rocking movement imparted to it by a lost motion spring 28 and a rocker arm 29. Each clip 25 is U-shaped in cross-section and the operation of the clip shovel 27 is such that one flange of each clip 25 is received between the two moulds 5 and 6 as they close, the remaining flange resting on a lip-like projection of the upper mould 5 and being steadied by a clip-supporting flange 30 carried by the upper mould 5.

After the punch 16 has executed its two downward strokes and removed the sprue or runner 14, the lower platen 9 moves downwardly to separate the moulds 5 and 6, after which a pusher arm 32 (FIGS. 1 and 6) engages one end of the weight 15 and ejects it from the moulds and pushes it down a delivery chute 33. The machine cycle then repeats itself. The arm 32 is pivoted about a vertical axis A and is operated, in timed relationship with the platen 9 and delivery member 3, by a piston and cylinder 34 which move the arm 32 so that it passes between the open moulds 5 and 6 and dislodges the weight 15 in an endwise direction from the upper mould 5 where it is supported by the clip 25. The operative end 35 of the arm 32 is shaped to correspond with the end of the balance weight 15 so that the minimum damage is done to the weight 15.

The complete cycle of the machine takes about four seconds and it will be realized that the provision of the punch not only produces cleanly moulded balance weights without sprues or runners but it is also such that the minimum of thermal wastage results because the sprues or runners are still quite hot when they re-enter the bath of molten material, the sprues or runners being of the order of only 10° to 15°C. cooler than the bath. This procedure is a great deal more economical than removing the sprues or runners and allowing them to cool before reheating them to a molten state, as has been done hitherto.

We claim:

1. A moulding machine for producing moulding metallic articles having partially embedded inserts, the machine comprising two mould supporting members, means for effecting relative movement of said mould supporting members during a moulding cycle, two moulds respectively carried by said two mould supporting members, said two moulds defining a mould cavity when closed, one of said moulds having a first passage extending through said one mould and communicating with the mould cavity, the other of said moulds having a second passage aligned with said first passage and having a projection defining a ledge extending horizontally along an external surface of the other mould, means for inserting one of said inserts between the moulds each time said moulds close in such manner that a projecting flange of said insert engages around said ledge on said other mould, a material delivery member which moves to an aperture in one of the mould supporting members for injecting moulding material, in a fluid or plastic condition, into said first passage in said one mould and thence into said cavity between the closed moulds, a punch which closes the second passage during injection of moulding material into the mould cavity, means for moving said punch with respect to the closed moulds into the first passage to part a sprue or runner, formed by excess moulding material, from an external peripheral edge surface of the moulded article when the latter is fully enclosed between the closed moulds, the displaced sprue or runner dropping out of said first passage, an ejection member and means for moving the ejection member with a horizontal reciprocating action between the two moulds when the latter open, at which stage the moulded article remains hanging on the other mould by virtue of the interengagement of the projecting flange of the insert with the ledge, means for moving said ejection member undergoing an operative stroke for pushing the moulded article to cause the flange to slide horizontally along the ledge, until the moulded article is clear of the other mould, after which the ejection member undergoes a return stroke between the open moulds, the moulds then closing and the aforesaid movements of the parts being repeated in cyclic sychronism to produce further moulded articles.

2. A moulding machine for producing moulded vehicle wheel balance weights, each weight having a metal clip for attaching the weight to a rim of the vehicle wheel, the machine comprising a bath for containing molten metal, upper and lower mould supporting members, means for effecting relative vertical movement of said mould supporting members during a moulding cycle, upper and lower moulds respectively carried by said upper and lower mould supporting members, the upper and lower moulds defining a mould cavity when closed, the lower mould having a vertical first passage extending completely through the lower mould and communicating with the mould cavity, the upper mould having a second vertical passage aligned with the first vertical passage and having a projection defining a ledge extending horizontally along an external surface of the upper mould, clip feed means for inserting one of the clips between the moulds each time the moulds close in such manner that a projecting flange of the clip engages around said ledge on said upper mould, a feed nozzle which is movable between a lowered position in which the feed nozzle is submerged below the level of the molten metal in the bath and a raised position in which the feed nozzle registers with an aperture in the lower mould supporting member for injecting molten metal into said first passage in said lower mould and thence into said cavity between the closed moulds, a punch which closes the second passage during injection of molten metal into the mould cavity, means for moving said punch downwardly with respect to the closed moulds into the first passage to part a sprue or runner, formed by excess metal, from an external peripheral edge surface of the moulded weight when the latter is fully enclosed between the closed moulds, the displaced sprue or runner, dropping out of said first passage, means for moving the nozzle meanwhile to the lowered position, an ejection member and means for moving the ejection member with a horizontal reciprocating action between the upper and lower moulds when the latter open, at which stage the moulded weight remains hanging on the upper mould by virtue of the interengagement of the projecting flange of the clip with the ledge, means for moving said ejection member undergoing an operative stroke for pushing the moulded weight to cause the flange of the clip to slide horizontally along the ledge, until the moulded weight is clear of the upper mould, after which the ejection member undergoes a return stroke between the open moulds, the moulds then closing and the aforesaid movements of the parts being repeated in cyclic synchronism to produce further moulded weights.

3. A machine according to claim 1, wherein the punch has a planar surface which parts the sprue or runner from the moulded articles along a substantially planar separation surface.

4. A machine according to claim 3, wherein the punch is generally D-shaped in cross-section.

5. A machine according to claim 1, wherein the other of the supporting members is a fixed upper platen and said one supporting member is a lower platen movable between a raised position in which the moulds come together to define the mould cavity, and a lowered position in which the moulds are separated for ejection of each moulded article.

6. A machine according to claim 1 and incorporating a bath for containing a supply of moulding material in a molten state, said one mould supporting member being disposed above the bath so that each disloded sprue or runner falls from the passage in said one mould into the bath, and wherein the material delivery member moves between raised and lowered positions, in the former of which a delivery nozzle communicates with the passage in said one mould to inject moulding material, and in the latter of which the delivery member is submerged below the level of the molten material in the bath, the movement of the material delivery member being synchronized with the movement of the punch and the relative movement of the two mould supporting members under the control of control means of the machine.

7. A machine according to claim 6, wherein the punch is operative to execute two reciprocatory strokes for each article moulded, to prevent the possibility of a sprue or runner adhering to the lower end of the punch.

8. A machine according to claim 7, wherein the control means are electro-pneumatic in nature.

9. A machine according to claim 1, wherein the arm is pivotally movable about a vertical axis.

10. A machine according to claim 2, wherein the clip feed means comprise a clip shovel operated in synchronism with the punch, the delivery member and the relative movement of the two mould supporting members to feed individual clips between the moulds, and a clip feed rail along which the clips pass toward the shovel under gravity.

11. A machine according to claim 2, wherein the ejection member is a pivotally movable arm, pivoted about a vertical axis, which undergoes a to and fro pivot movement between the open moulds during each cycle.

12. A machine according to claim 2, wherein the upper mould is fixed and the lower mould is movable upwardly toward the upper mould as the moulds close.

* * * * *